Dec. 22, 1964  D. W. LYNA ETAL  3,161,961
BLADE ALIGNMENT GAGE

Filed Oct. 25, 1960  2 Sheets-Sheet 1

INVENTORS
GEORGE G. WALKER, JR.
DONALD J. O'HARE
DONALD W. LYNA

BY Harris G. Lucher
ATTORNEY

Dec. 22, 1964  D. W. LYNA ETAL  3,161,961
BLADE ALIGNMENT GAGE
Filed Oct. 25, 1960  2 Sheets-Sheet 2

INVENTORS
GEORGE G. WALKER, JR.
DONALD J. O'HARE
DONALD W. LYNA
BY Harris G. Luther
ATTORNEY 3,161,961
BLADE ALIGNMENT GAGE
Donald W. Lyna, Windsor Locks, Donald J. O'Hare, West Hartford, and George G. Walker, Jr., Manchester, Conn., assignors to United Aircraft Corporation, East Hartford, Conn., a corporation of Delaware
Filed Oct. 25, 1960, Ser. No. 64,832
5 Claims. (Cl. 33—174)

This invention relates to a blade alignment gage and particularly to a gage for checking the alignment of airplane propeller blades.

In the operation of airplane propellers contact is occasionally inadvertently made with foreign objects such as birds, ground lights, snow banks, etc. While such contact is many times not serious, occasionally such contact may bend the blades sufficiently to render further service in the bent condition unadvisable although the bent condition may not be apparent upon visual inspection. It is, therefore, advisable to periodically inspect the blade for longitudinal alignment.

It is therefore an object of this invention to provide a gage for checking the alignment of the propeller blade while still mounted on the engine and airplane.

A further object is a gage which may be held in position by gravity on a horizontally extending blade and indicate any variation of the blade from a predetermined alignment.

A still further object is a gage having means for locating the gage in a predetermined position with respect to one portion of the blade surface and indicate the departure of a spaced portion of the blade surface from a predetermined position.

Other objects and advantages will be apparent from the following specification and claims and from the accompanying drawings which illustrate a preferred embodiment of the invention in which—

Figure 1:
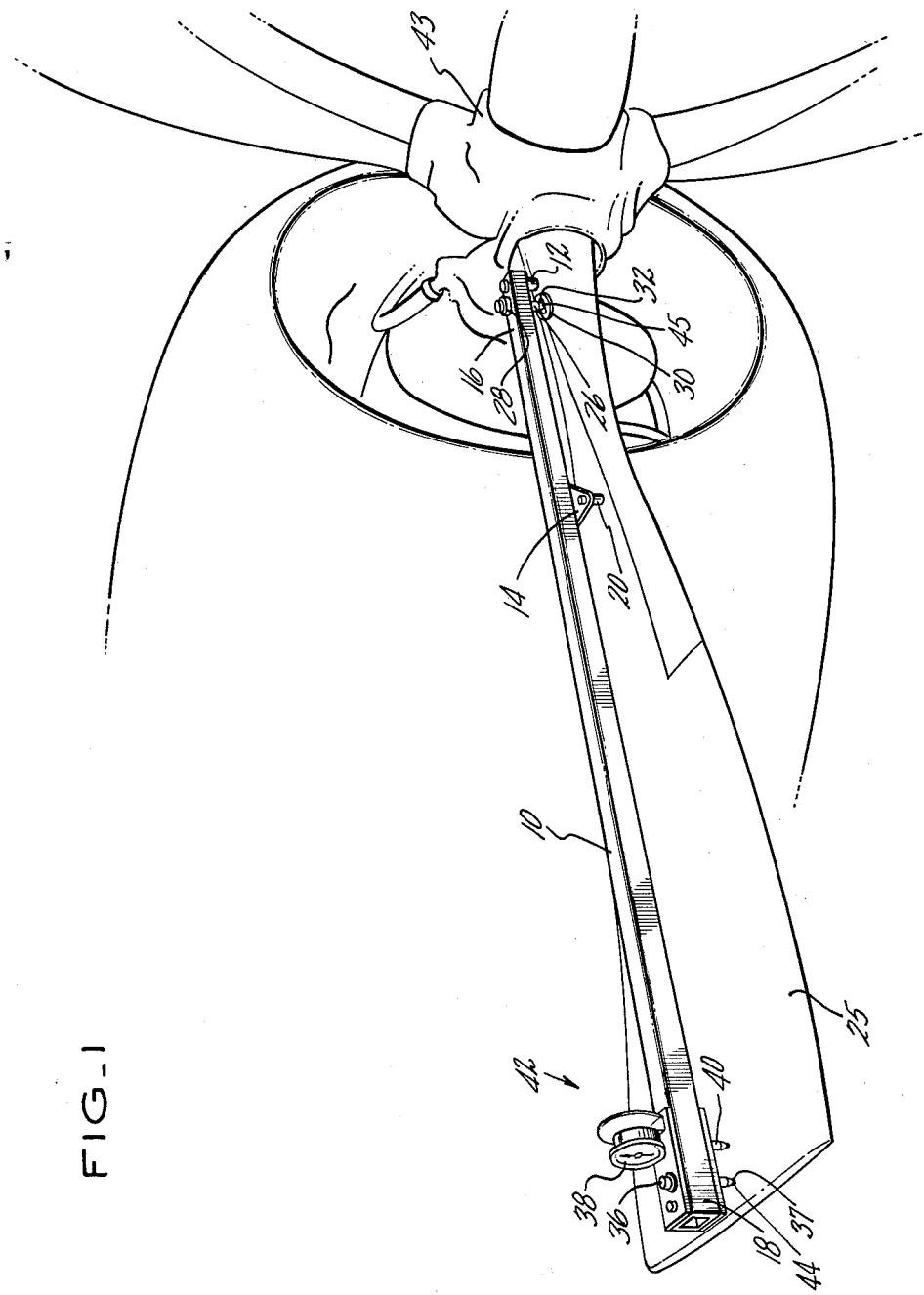
FIGURE 1 shows the gage applied to an airplane propeller blade.
Figure 2:
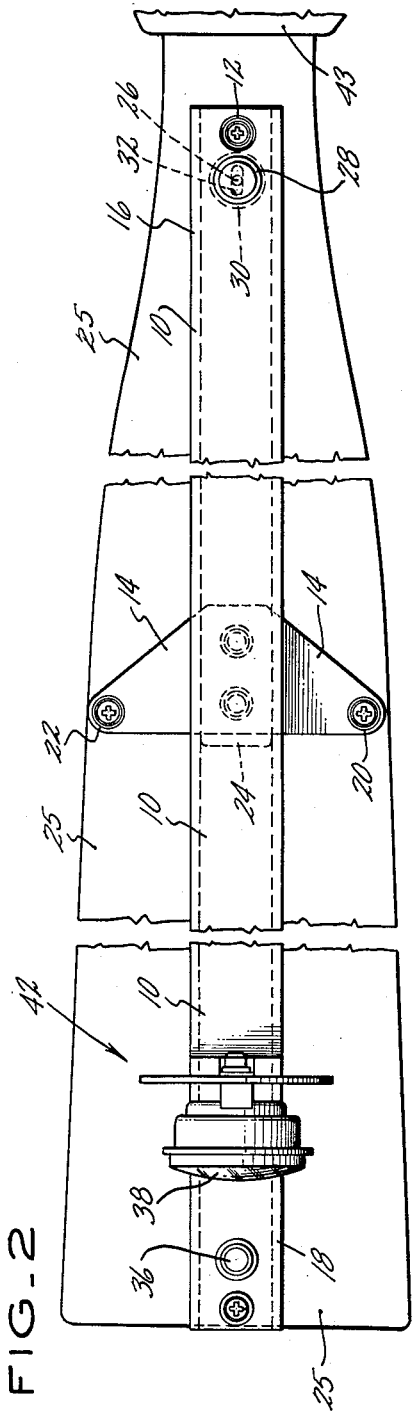
FIGURE 2 is plan view of the gage.
Figure 3:
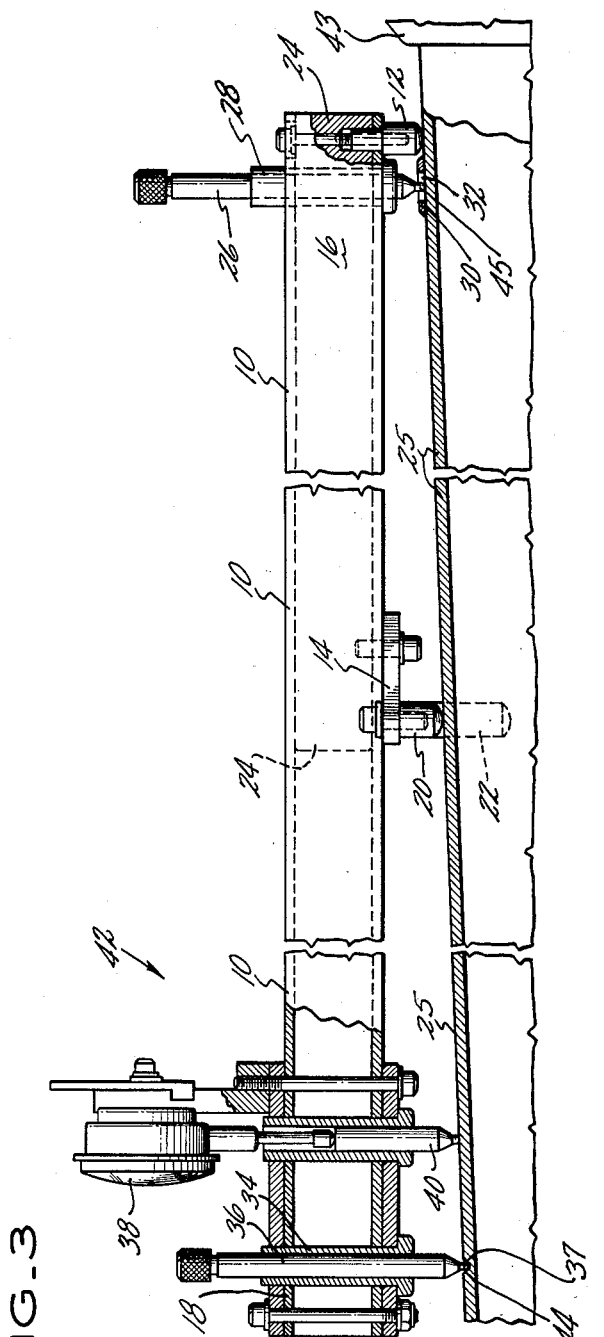
FIGURE 3 is a side view, partially in section, of the gage.

The gage comprises a bar or elongated arm 10 constituting the body of the gage. This bar may be a substantially square hollow aluminum tube. A foot 12 forming one element of a tripod support is secured to and depends, or extends outward, from substantially the center line of the bar 10 adjacent one end 16 thereof. A cross-arm 14 extending transversely of the bar 10 is secured thereto midway between the ends of the bar and preferably nearer the end 16 than the end 18 thus defining a short end 16 and a long end 18. The arm 14 carries two spaced feet, 20 and 22, located on the same side of bar 10 as foot 12 adjacent the outer ends of the cross-arm 14, on opposite sides of a plane defined by the foot 12 and the center line of bar 10 and provides the other two elements of the tripod support for the bar 10 and a balancing point or axis. A weight member 24 preferably located inside of the tube 10 and between the feet of the tripod support serves to hold the foot 12 in contact with the propeller blade 25 when the gage is placed on the blade 25 and prevents the long end 18 from overbalancing the short end 16 of the bar 10 about the pivot or balance point formed by the feet 20 and 22. A locating pin 26 extending from bar 10 in the same direction as foot 12 is slideable in the same direction through substantially the center line of bar 10 in a bushing 28 carried by the bar 10 serves to locate the bar transversely of the propeller blade 25 by engaging and cooperating with a fixed reference point on the blade. This reference point may be a patch 30 having an elongated slot 32 therein and adhesively secured to the surface of the blade inboard end. The outer end of the bar 10 carries a bushing 34 in which a locating pin 36 extending from bar 10 in the same direction as foot 12 is slideable in the same direction through substantially the center line of the bar 10 for engagement with a reference point on the outer or tip portion of the blade which reference point may be in the form of a dimple or drilled spot 37 in the blade surface. The bar 10 also carries substantially on the center line of bar 10 and adjacent the outer end 18 an indicator in the form of a dial indicator 38 suitably mounted on the bar 10. A contact element 40 adapted to contact the blade surface when the gage is positioned on the blade will actuate the indicator 38 and give an indication of the position of the contacted portion of the blade surface with respect to a line, such as the axis of bar 10, in a plane established by the tripod support 12, 20, and 22.

In use, the gage shown generally at 42 is laid on a propeller blade, or non-planar surface to be measured, which has reference points such as 32 and 37 established thereon. The blade 25 is positioned to present as nearly a horizontal surface as shown in FIG. 1 as can be conveniently done by supporting the blade in a fixture on an inspection bench, or if in an assembled propeller by rotating the propeller on its axis to bring the blade 25 into a horizontal position and turning the blade on its axis in the hub 43 to substantially feathered position so that the gage will have substantially no tendency to slide off of the surface. The gage is held down against the surface to be measured by gravity and is positioned with the foot 12 on the inboard portion of the blade and the feet 20 and 22 at cordwise spaced positions on the blade surface somewhat outboard of the foot 12 to locate and space the gage transversely of the blade surface. The feet 20 and 22 are generally made of different lengths to accommodate the twist or curvature of the blade surface and maintain the axis of the index pins 26 and 36, and the axis of the indicator 38 or indicator pin 40 as near normal to the surface being measured as is practicable. In placing the gage 42 on the blade, the locating portion 45 of the locating pin 26 mates with and is placed in the longitudinally extending slot 32 of the reference element 30 and the locating portion 44 of the locating pin 36 mates with and is placed in the dimple 37. The tripod feet 12, 20, and 22 serve to position the outer end 18 of the bar 10 by the surface of the blade adjacent the shank end, which is a stiff portion of the blade and the least liable to be distorted or bent. However, any distortion in this inboard area will, of course, show up as a changed position of the blade indicator 38. Locating pins 26 and 36 and their associated mating reference points on the blade serve to define a line with respect to said reference points in the plane established by the tripod supports and to locate and hold the gage transversely, and axially of the blade with the bar 10 generally parallel to the blade axis. Hence the tripod support 12, 20, 22, locates the indicator 38 and the bar 10 vertically spaced transversely from or with respect to the blade surface and the locating pins 26 and 36 locate the indicator 38 and the bar 10 horizontally, generally parallel, with respect to the blade surface including both transversely or chordwise and axially with respect to the blade. The indicator 38 is adjusted or calibrated in a suitable manner, such as application of the gage 42 to a suitable master such as a perfect blade, to indicate the predetermined or established blade alignment and provide a zero or reference setting for the indicator.

In order to compensate for manufacturing tolerances, from blade to blade, a calibrated gage then is applied to a known "good" blade and a reference reading established for that particular blade. If the particular blade is then reinspected with a calibrated gage on a routine check basis or because of suspected damage and the reading for that particular blade is now different from the previously established reference reading, the blade is now "bad." If the reading is the same or within a tolerance the same, the blade is still "good." The blade may then be continued in service if the distortion is slight or immaterial or removed from service if the indicated distortion is sufficient to render it inadvisable to continue the blade in service. The distorted blade may then be returned to the factory for straightening, reworking, and removal of the distortion.

It is to be understood that the invention is not limited to the specific embodiment herein illustrated and described, but may be used in other ways without departure from its spirit and that various changes can be made which would come within the scope of the invention, which is limited only by the appended claims.

We claim:

1. A measuring device for measuring the longitudinal alignment of a propeller blade supported in a hub or fixture, comprising an elongated arm, means for supporting said arm in a predetermined position on the surface of a blade to be measured and including a foot adjacent one end of the arm and spaced feet spaced transversely of said arm intermediate the ends of said arm, said feet adapted to rest on a blade surface and locate said arm in a predetermined position spaced from said surface, locating means comprising pins axially movable transversely of said arm and extending transversely outward adjacent each end of said arm and adapted to cooperate with and engage respective mating reference stations on the blade surface for locating the arm in a single fixed predetermined transverse and axial position with respect to said blades, and indicator means adjacent the other end of said arm remote from said foot adapted to contact the blade surface to determine the longitudinal alignment of the blade.

2. A gage for indicating the longitudinal alignment of a blade subject to distortion and having a curved and twisted surface, a shank portion, a tip portion and a reference point including a local change in elevation on said surface at each of said portions, comprising a bar, a support for said bar adjacent one end of said bar comprising a foot adjacent said one end of said bar adapted to rest on the blade shank portion, spaced feet spaced transversely of said bar between the ends of said bar and adapted to rest on chordwise spaced portions of said blade between the shank and tip portions and movably support said bar on said blade, locating means carried by said bar and extending substantially normal to said bar and said blade surface and movable substantially normal to said bar and blade surface to accommodate blade distortion for registering and mating with said reference points to locate and hold said bar in a predetermined position longitudinally and chordwise of said blade with the tripod supports resting on selected blade portions and establishing a predetermined position in three directions for said bar with respect to said blade, indicator means carried by said bar for indicating the location of the tip portion of said blade with respect to said predetermined position of said bar to indicate the longitudinal alignment of said blade.

3. A gage for checking the alignment of a non-planar surface subject to distortion and having a pair of spaced reference points thereon, comprising an elongated gage body, a tripod support for one end of said body adapted to rest on said surface establish a horizontal plane and position said body by gravity in a vertical direction, locating means carried at spaced portions of said body corresponding to said points for positioning said body in a predetermined position in a horizontal direction with respect to said surface, said locating means comprising bushings supported by said body and elongated pins slideable transversely of said body in said bushings toward said surface to accommodate said distortion, and into mating relation with said reference points, and indicator means carried by said body in a position spaced from said support for indicating the vertical alignment of said surface at said indicator position with respect to the substantially horizontal plane established by said tripod support with said body in said predetermined position.

4. A measuring device for measuring the longitudinal alignment of a propeller blade subject to distortion comprising, an elongated arm weighted at one end, means for supporting said arm in a predetermined position on the upper surface of a blade to be measured including a foot adjacent the weighted end of said arm adapted to rest on the blade shank, and a pair of spaced feet spaced transversely of said arm intermediate the ends of said arm adapted to rest on chordwise spaced points of the blade portion of the propeller, said spaced feet disposed substantially nearer said weighted end and providing a short and a long end of said arm, said arm urged by gravity toward said blade surface with said feet resting on said surface with said short weighted end over-balancing said long end and locating said arm in a predetermined plane spaced from said surface, locating means extending outwardly from and adjacent each end of said arm and adjustable toward and from said surface to compensate for distortion of said surface and adapted to engage and mate with reference stations on and movable with the blade surface for locating the arm in a single fixed predetermined transverse and axial position in said plane with respect to said blade, and indicator means adjacent the outer end of the long end of said arm adapted to contact the blade surface to determine the longitudinal alignment of the blade.

5. A portable indicator comprising an elongated bar having a long end and a short end three supporting feet for said bar, including one foot extending transversely outward from substantially the longitudinal centerline of said bar adjacent the outer end of said short end, and two spaced feet supported by said bar between the ends of said bar substantially nearer one end and on the same side of said bar as said one foot and spaced on opposite sides of a plane defined by said one foot and said centerline and forming a pivotal support for said bar and defining said short end and said long end, a weight supported by said short end to prevent over-balancing of said short end by said long end, other locating means for said bar including pins, one adjacent the outer end of each end of said bar on substantially the centerline of said bar and extending in the same direction as said one foot, means movably supporting said pins on said bar for movement in said direction with respect to said bar, and an indicator supported on said bar substantially on said centerline adjacent the outer end of said long end of said bar and having a work contacting member movable in said direction.

References Cited by the Examiner

UNITED STATES PATENTS

| 1,303,387 | 5/19 | Pogue | 33—172 |
| 1,389,912 | 9/21 | Stead | 33—172 |
| 2,238,782 | 4/41 | Roche | 33—174 |
| 2,799,940 | 7/57 | Nagle et al. | 33—172 |

FOREIGN PATENTS

| 369,878 | 3/32 | Great Britain. |

ISAAC LISANN, *Primary Examiner.*